United States Patent
Alexander et al.

(10) Patent No.: US 11,418,933 B2
(45) Date of Patent: Aug. 16, 2022

(54) FACILITATION OF CONTAINER MANAGEMENT FOR INTERNET OF THINGS DEVICES FOR 5G OR OTHER NEXT GENERATION NETWORK

(71) Applicant: AT&T Mobility II LLC, Atlanta, GA (US)

(72) Inventors: Jordan Alexander, Kennesaw, GA (US); Stephen T. Hardin, Suwanee, GA (US); Dennis McCain, Colleyville, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 70 days.

(21) Appl. No.: 16/823,687

(22) Filed: Mar. 19, 2020

(65) Prior Publication Data

US 2021/0297824 A1 Sep. 23, 2021

(51) Int. Cl.
| | |
|---|---|
| *H04W 4/38* | (2018.01) |
| *H04W 4/02* | (2018.01) |
| *H04W 4/70* | (2018.01) |
| *H04W 84/12* | (2009.01) |

(52) U.S. Cl.
CPC .............. *H04W 4/38* (2018.02); *H04W 4/027* (2013.01); *H04W 4/70* (2018.02); *H04W 84/12* (2013.01)

(58) Field of Classification Search
CPC ......... H04L 67/303; G07C 5/02; B60W 40/09
USPC ......................................... 705/14.14; 348/47
See application file for complete search history.

(56) References Cited

U.S. PATENT DOCUMENTS

| | | |
|---|---|---|
| 9,509,628 B2 | 11/2016 | Moeller |
| 9,635,057 B2 | 4/2017 | Bone et al. |
| 10,009,707 B2 | 6/2018 | Ly et al. |
| 10,321,311 B2 | 6/2019 | Sasin et al. |
| 10,382,394 B2 | 8/2019 | Sasin et al. |
| 10,455,057 B2 | 10/2019 | Mathison et al. |

(Continued)

FOREIGN PATENT DOCUMENTS

| | | |
|---|---|---|
| CN | 109361771 A | 2/2019 |
| EP | 3427443 A1 | 9/2017 |

(Continued)

OTHER PUBLICATIONS

"OMA LightweightM2M (LwM2M) Object and Resource Registry." oma SpecWorks, http://www.openmobilealliance.org/wp/OMNA/LwM2M/LwM2MRegistry.html. Last Accessed Feb. 27, 2020. 27 pages.

(Continued)

*Primary Examiner* — Kiet M Doan
(74) *Attorney, Agent, or Firm* — Amin, Turocy & Watson, LLP

(57) ABSTRACT

A lightweight machine-to-machine (LWM2M) protocol can be utilized as a management layer for other applications pertaining to communication and retrieval of information from hardware peripherals. The applications can be managed via a client and the applications can communicate to the client via a standard proxy or message broker. Consequently, sensor codes can be decoupled from the client codes, thus allowing them to both be independent interchangeable components of a specific device's architecture. Therefore, sensors can be added, removed, and/or manipulated without modifying the underlying management layer.

20 Claims, 10 Drawing Sheets

(56) References Cited

U.S. PATENT DOCUMENTS

| | | | |
|---|---|---|---|
| 2015/0109917 A1 | 4/2015 | Lu et al. | |
| 2017/0048336 A1 | 2/2017 | Novo et al. | |
| 2017/0208457 A1 | 7/2017 | Shao | |
| 2017/0279686 A1 | 9/2017 | Shao | |
| 2017/0279688 A1 | 9/2017 | Shao | |
| 2017/0351508 A1 | 12/2017 | Jahn et al. | |
| 2018/0183897 A1 | 6/2018 | Singhal | |
| 2018/0359621 A1 | 12/2018 | Singhal et al. | |
| 2019/0036875 A1 | 1/2019 | Jimenez et al. | |
| 2019/0222653 A1 | 7/2019 | Dauneria et al. | |
| 2019/0288869 A1* | 9/2019 | Chamarajnager | H04L 67/125 |
| 2019/0319917 A1 | 10/2019 | Jimenez et al. | |
| 2020/0037226 A1* | 1/2020 | Magadevan | H04W 4/80 |

FOREIGN PATENT DOCUMENTS

| | | |
|---|---|---|
| KR | 20190048769 A | 5/2019 |
| WO | 2015149531 A1 | 10/2015 |
| WO | 2017153093 A1 | 9/2017 |
| WO | 2019009263 A1 | 1/2019 |
| WO | 2019114972 A1 | 6/2019 |
| WO | 2019233275 A1 | 12/2019 |

OTHER PUBLICATIONS

Datta, et al. "A Lightweight Framework for Efficient M2M Device Management in oneM2M Architecture." 2015 International Conference on Recent Advances in Internet of Things (RioT), Singapore, Apr. 7-9, 2015. 6 pages.

Municio, et al. "Whisper: Programmable and Flexible Control on Industrial IoT Networks." Sensors 2018, 18, 4048; doi:10.3390/s18114048. 24 pages.

Prado. "OMA Lightweight M2M Resource Model." IAB IoT Semantic Interoperability Workshop 2016. 5 pages.

Robles, et al. "Design of a Performance Measurements Platform in Lightweight M2M for Internet of Things." IRTF & ISOC Workshop on Research and Applications of Internet Measurements (RAIM). 2015. 4 pages.

Tracey, et al. "How to see through the Fog? Using Peer to Peer (P2P) for the Internet of Things." 2019 IEEE 5th World Forum on Internet of Things (WF-IoT). IEEE, 2019. 6 pages.

"OMA SpecWorks for a Connected World: IPSO Smart Objects" OMA SpecWorks, https://omaspecworks.org/develop-with-oma-specworks/ipso-smart-objects/, Last Accessed Jun. 22, 2020, 6 pages.

"OMA SpecWorks for a Connected World: IPSO Alliance" OMA SpecWorks, https://www.omaspecworks.org/ipso-alliance/, Last Accessed Jun. 22, 2020, 3 pages.

* cited by examiner

FACILITATION OF CONTAINER MANAGEMENT FOR INTERNET OF THINGS DEVICES FOR 5G OR OTHER NEXT GENERATION NETWORK

TECHNICAL FIELD

This disclosure relates generally to facilitating container management for Internet of things (IoT) devices. For example, this disclosure relates to facilitating container management for IoT devices with lightweight machine to machine communication for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating container management for IoT devices is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
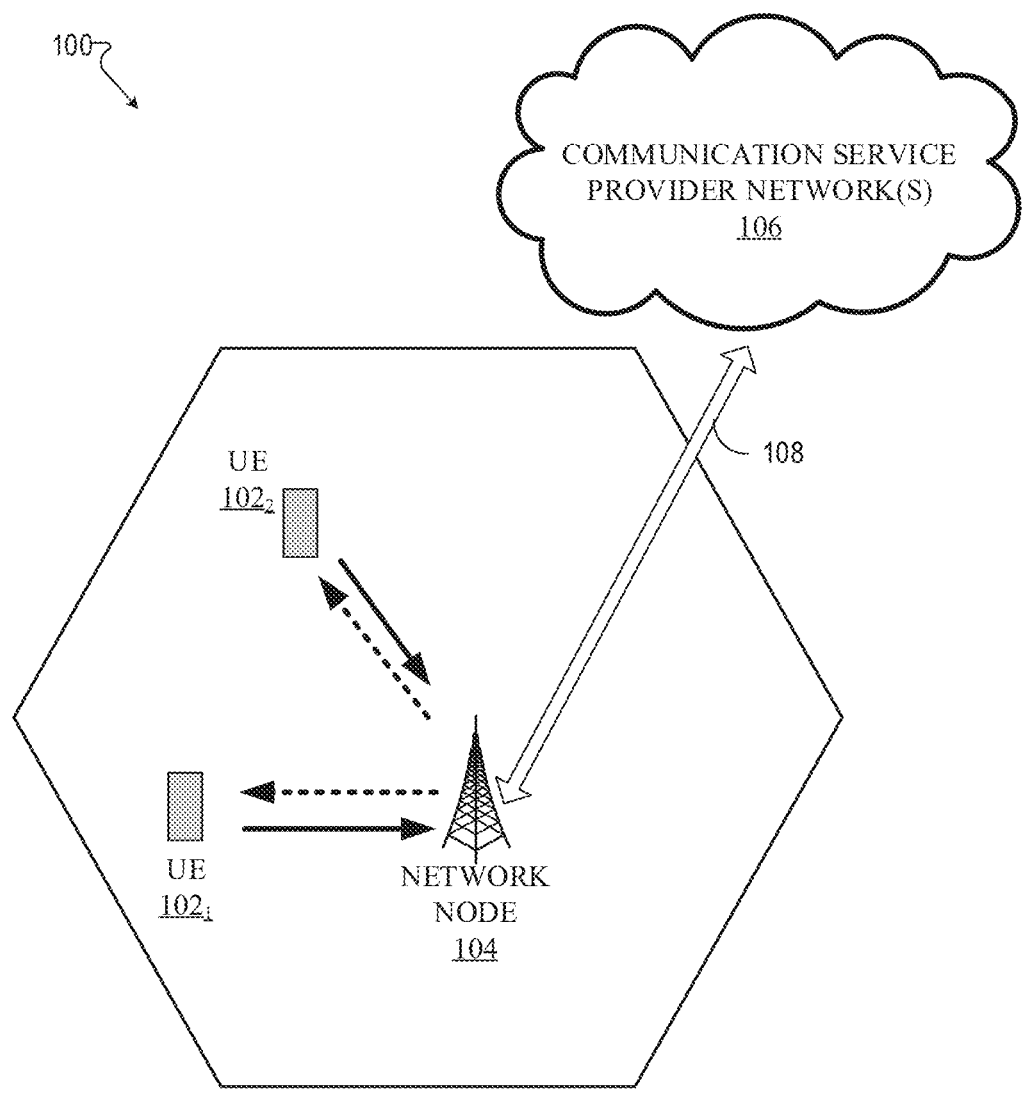
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate container management for IoT devices for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate container management for IoT devices for a 5G network. Facilitating container management for IoT devices for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Sensors can be added, removed and/or manipulated without changing an underlying management layer. When IoT devices need a change to a sensor or need added functionality, the IoT devices typically have to receive updates over the air, which can be a heavy function and can fail. Currently, there are methodologies that involve firmware upgrades, but these methods require manipulations by the manufacturer, and the customer of the device has to understand the device for the update to be delivered.

This disclosure proposes using an LWM2M protocol as the management layer for other applications pertaining to the communication and retrieval of information from hardware peripherals. The applications can be managed via the hardware client and the applications can communicate to the hardware client via a standard proxy or message broker. This decouples the sensor code from the client code allowing them to both be independent interchangeable components of a specific device's architecture. The applications can also be developed and maintained by developers outside of the manufacturer to increase flexibility.

Thus, IoT devices can become more generic and developers can focus more on developing for particular sensors or use cases and focus less on the overall management of the device. These products can be built using existing LWM2M servers. The LWM2M client can also, by default, give access to the general purpose input/output (GPIO) peripherals (e.g., Wi-Fi, Bluetooth, GPS, accelerometer, radio information, etc.) and/or any information relating to the state of the operating system (free memory, free storage, etc.). The interface to the default hardware peripherals can be done through the standard objects in the LWM2M technical specification and any internet protocol for smart objects (IPSO) that correspond to hardware on a user equipment (UE). It should be noted that various UEs can be used based on the disclosed system. For example, a connected cooler radio (CCR), it one type of UE and the disclosed aspects herein shall not be limited to the CCR.

GPIO can be tied to individual instances of a digital input object. One approach to managing whether the GPIO is setup to be an input pin or an output pin can be tied to the actual presence of the object. For example, if the digital input object is created and the instance identification (ID) of the object is 20, then pin 20 on a CCR can be configured to be a digital input pin and the resources within the digital input object can describe the configuration of the pin. This idea can be applied to the module pin numbers to make the client portable to other device builds.

To manage resetting the pin, deinitialization of the pins can be conducting at the deletion of the controlling object. For example, if the digital input object has been created and the user of the device now needs the pin to be setup as a digital output, the digital input object corresponding to the targeted pin can be deleted, resulting in the deinitialization of the pin. Once the pin is freed, then the digital output pin can be created and the pin can assume the role of an output pin.

The Wi-Fi on the CCR can be managed via a wireless local area network (WLAN) object ID 12 and the LWM2M application can maintain the typical functionality of the Wi-Fi peripheral (e.g., access point mode, station mode, bridge mode, etc.). The behavior of the object can describe the current state of the peripheral and be available to change that state via communication with the server. For example, the resources within the object can dictate whether the radio is enabled or disabled. However, in the general case, the application can maintain control of the peripheral.

The presence of the object can dictate whether the Wi-Fi peripheral is controlled by the LWM2M application. The object can by default be available and control the configuration, but upon deletion of the object, the LWM2M application can relinquish control in order to allow another application control of the peripheral. If another application has control of the peripheral and the object is created, the LWM2M application can take precedence over any other application and regain control of the Wi-Fi peripheral.

Because the Bluetooth peripheral may not have a corresponding LWM2M object in the standard, a custom object can be used to maintain consistency with the management of the devices using LWM2M. The custom object can follow the same pattern of peripheral release at the time of deletion. The custom object can also take precedence over any other application if it is recreated in the client. The GPS peripheral can by default be controlled by the location object (ID 6) from the standard set of open mobile alliance (OMA) LWM2M objects. This object can follow the same pattern of peripheral release at the time of deletion. The object can also take precedence over any other application if it is recreated in the client.

The accelerometer data can be reported via the accelerometer object (ID 3313) defined by the IPSO alliance. The object can be instantiated by default and be available for control. This can follow the same pattern of peripheral release at the time of deletion. The object can also take precedence over any other application if it is recreated in the client. The definitions of the objects and the way that the objects can be used in conjunction with the hardware can follow the definitions given in the registry. For custom objects, if there is an available resource that has been defined, the preferred definition of the object can use the available resources and the numbering for that resource. This methodology can maintain definitions across multiple implementations of the LWM2M client.

A containerized concept of application development can be applied to the CCR in order to maintain easy management of the device via the LWM2M while also allowing for developers to develop native applications. This can provide maximum flexibility for development on the CCR while also enabling a wide range for developers. The LWM2M application can be the default application, and the client can communicate to drivers for objects via a proxy layer. This layer can be a message queue (e.g., zero MQ, etc.). This means that the LWM2M client cannot be directly accessing any peripherals and can receive the telemetry data from other applications managing the peripherals. The LWM2M client can maintain the state of the default drivers in order to maximize the efficiency of what is running.

The LWM2M server can facilitate firmware and configuration updates such that deployment and management of a hardware device can be performed without deploying an entire new build of firmware for the particular hardware device. A baseline layer of an LWM2M client can communicate with other software components that can receive updates. Thus, a developer can develop their own driver for the hardware device, upload the driver to a LWM2M server, and manage the installation and running of the driver specific to the hardware device. Currently, a modification to a connected cooler radio (CCR) can require communication with the hardware manufacturer. However, this disclosure can break software components out into individual pieces.

In another embodiment, sensors can be repurposed. For example, if the hardware device was initially used to procure temperature data, the hardware device can be repurposed and no longer need to use general purpose input/output (GPIO) anymore. Thus, a delete operation can be performed on the temperature object at the server device. The delete operation can be communicated to the LWM2M client, the client can remove the temperature driver and/or prevent it from operating, and take back over control of the pins from the driver that the developer had developed. These pins can then be repurposed for a different driver.

Drivers can be built either using prepared hardware libraries and/or new peripheral libraries built by a hardware manufacturer. In any case the driver at run time can be given the necessary access to peripherals available on the device. A fault management function can manage two drivers requesting access to the same peripheral. Debugging logs can be made available in the development context. A mechanism for logging issues remotely could be built into the LWM2M client in addition to a local logging mechanism.

The proxy can make use of one of device protocols in order to normalize the communication between drivers and client. The messages that are sent between drivers and clients can make use of some level of serialization such as message structures (e.g., JSON, CBOR, etc.) in order to create a degree of order for the developer to follow so that the LWM2M client 202 can decode messages from the driver using key/value pairing via maps. Object ID's and resource ID's can be used as key names in the messages sent. This can be used to create a data structure that can be easily deciphered by the LWM2M client.

In one embodiment, described herein is a method comprising receiving, by a wireless network device comprising a processor, structure data representative of a structure to be associated with a driver. The method can comprise receiving, by the wireless network device, driver data representative of the driver to be installed at the wireless network device. Additionally, the method can comprise translating, by the wireless network device, sensor data associated with the driver to conform to the structure, resulting in conformed data. Furthermore, in response to the translating the sensor data, the method can comprise facilitating, by the wireless network device, transmitting the conformed data to a server device.

According to another embodiment, a system can facilitate, receiving, from a first server device, structure data representative of a structure to be applied to sensor data associated with a driver. The system can comprise receiving, from a second server device, driver data representative of the driver to be downloaded to a hardware device. Based on the driver data, the system can comprise downloading the driver from the second server device. In response to the downloading the driver, the system can comprise translating the sensor data to conform to the structure, resulting in conformed data.

According to yet another embodiment, described herein is a machine-readable storage medium that can perform the operations comprising receiving, from a first server device, structure data representative of a structure to be applied to sensor data associated with a driver. The machine-readable storage medium can perform the operations comprising receiving, from a second server device, driver data, wherein the driver data is representative of the driver to be utilized by a hardware device. Additionally, in response to the receiving the driver data, the machine-readable storage medium can perform the operations comprising utilizing the driver to facilitate a temperature reading, resulting in temperature data. Furthermore, in response to the utilizing the driver, the machine-readable storage medium can perform the operations comprising translating the temperature data to conform to the structure, resulting in conformed data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
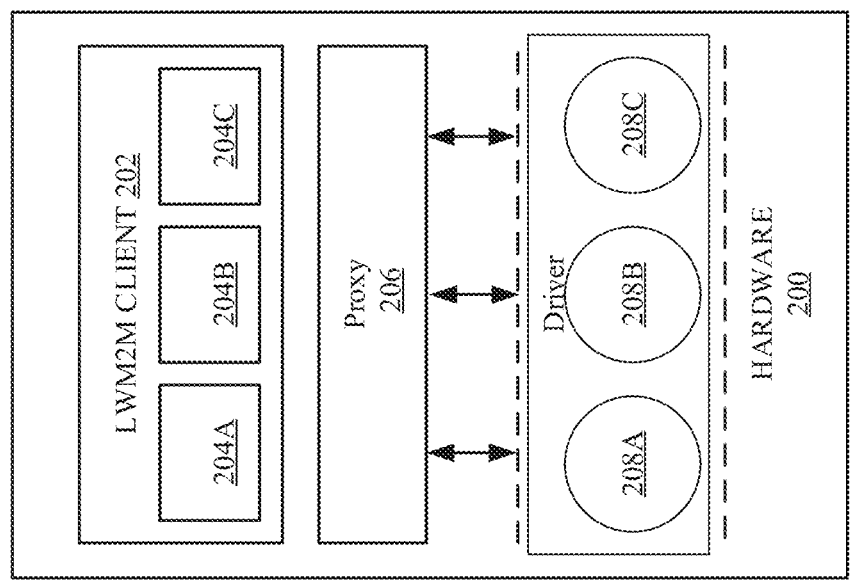
FIG. 2 illustrates an example schematic system block diagram of an IoT device according to one or more embodiments.

Referring now to FIG. 2, illustrated is an example schematic system block diagram of an internet of things device according to one or more embodiments. Currently, the drivers for various sensors are a part of the LWM2M client. Therefore, when a user would like to switch from one sensor to another sensor, the entire LWM2M client 202 (entirety of the firmware) must be updated. Given the LwM2M client is the controlling element in the proposed software architecture carrier certification will typically encompass the client. If the client has to be rebuilt and changed the carrier certification for the UE must be completed again. In the proposal since the LwM2M client is not rebuilt to change the sensor drivers and provides an abstraction to connectivity and hardware management, carrier certification does not necessarily have to be revised when installing software application.

However, as depicted in FIG. 2, the drivers 208A, 208B, 208C of the hardware device 200 can be separate from the LWM2M client 202 but can communicate with the LWM2M client via a proxy 206 (e.g. message queue (MQ) proxy). The driver layer can receive new drivers from a sensor/driver registry that can be maintained by a service provider or delivered by the developer. This can be as simple as a secure file transfer protocol (sFTP) download or a rest protocol blockwise transfer from a service provider device management server. The delivery and maintenance of the drivers available on the hardware device 200 can be managed by a custom LWM2M object.

Figure 3:
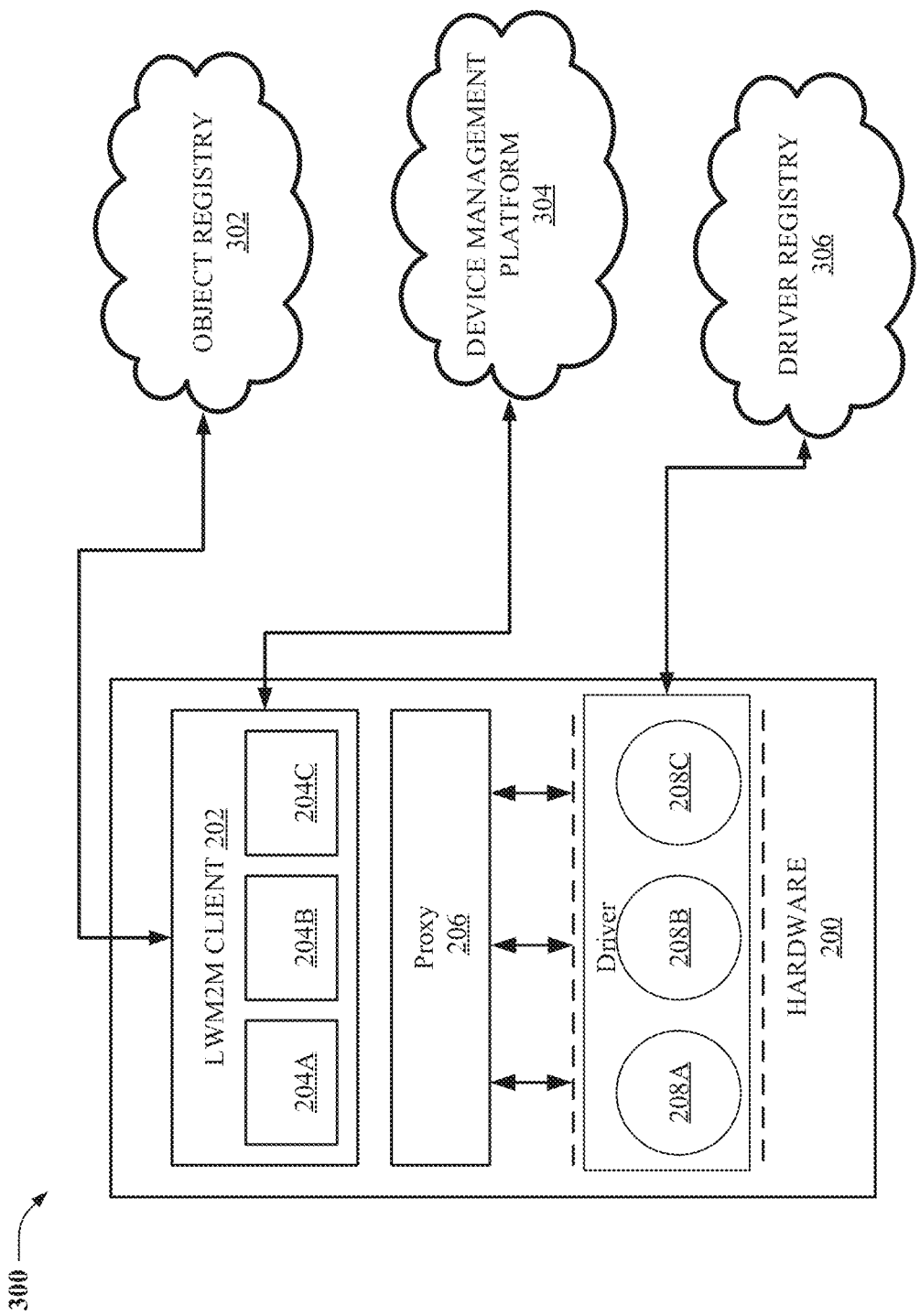
FIG. 3 illustrates an example schematic system block diagram of an IoT device updating system according to one or more embodiments.

Referring now to FIG. 3, illustrated is an example schematic system block diagram of an internet of things device updating system according to one or more embodiments.

In another embodiment, a sensor driver registry 306 can store drivers to be placed into a device management platform 304, from where the hardware device 200 can download the drivers. This allows communication to a particular sensor such that the entire LWM2M client 202 does not have to be updated, and the LWM2M client 202 can manage the process in relation to a server associated with the device management platform 304 and/or the device registry 306.

The object registry 302 can comprise structures of particular objects. For example, temperature can be object 204A, and under the object there can be resources describing the object 204A (e.g., actual temperature value, unit=Celsius/Fahrenheit, max/min value, etc.) Thus, the object registry 302, can provide a structure for the LWM2M client 202 to be able to create a storage point for the resource values on the fly. The object 204A can represent storage of a value of a physical reading provided by the driver 208A. The communication between the object 204A and the object registry 302 can be managed by the LWM2M client 202. Consequently, the LWM2M client 202 may not have the functionality of what it takes to physically read a temperature sensor (which can be performed at the driver 208A), yet the LWM2M client 202 can facilitate passing the sensor data back to the object registry 302 and/or the device management platform 304. The MQ proxy 206 can translate data between the driver 208A driver and the object 204A of the LWM2M client 202. Thus, developers can update the drivers from the driver registry 306 and/or update the objects from the object registry 302.

For example, a developer can build an application for the hardware device 200 that can communicate via the MQ proxy 206 to the LWM2M client 202 and place the application in the sensor/driver registry 306 for delivery to the driver layer of the hardware device 200. The developer can then use the device management platform 304 to deliver the application to the hardware device LWM2M client 202. The developer can also tell the hardware device 200 where to download the sensor/driver from, which could be done via the delivery of a URL to the hardware device 200. Upon initiating the install of the sensor, the LWM2M client 202 can go to the object registry 302 to pull the object definition. Given the delivery of the definition, the LWM2M client 202 can create the objects with their proper mechanisms and begin to listen on the topic for the data coming from the driver.

Figure 4:
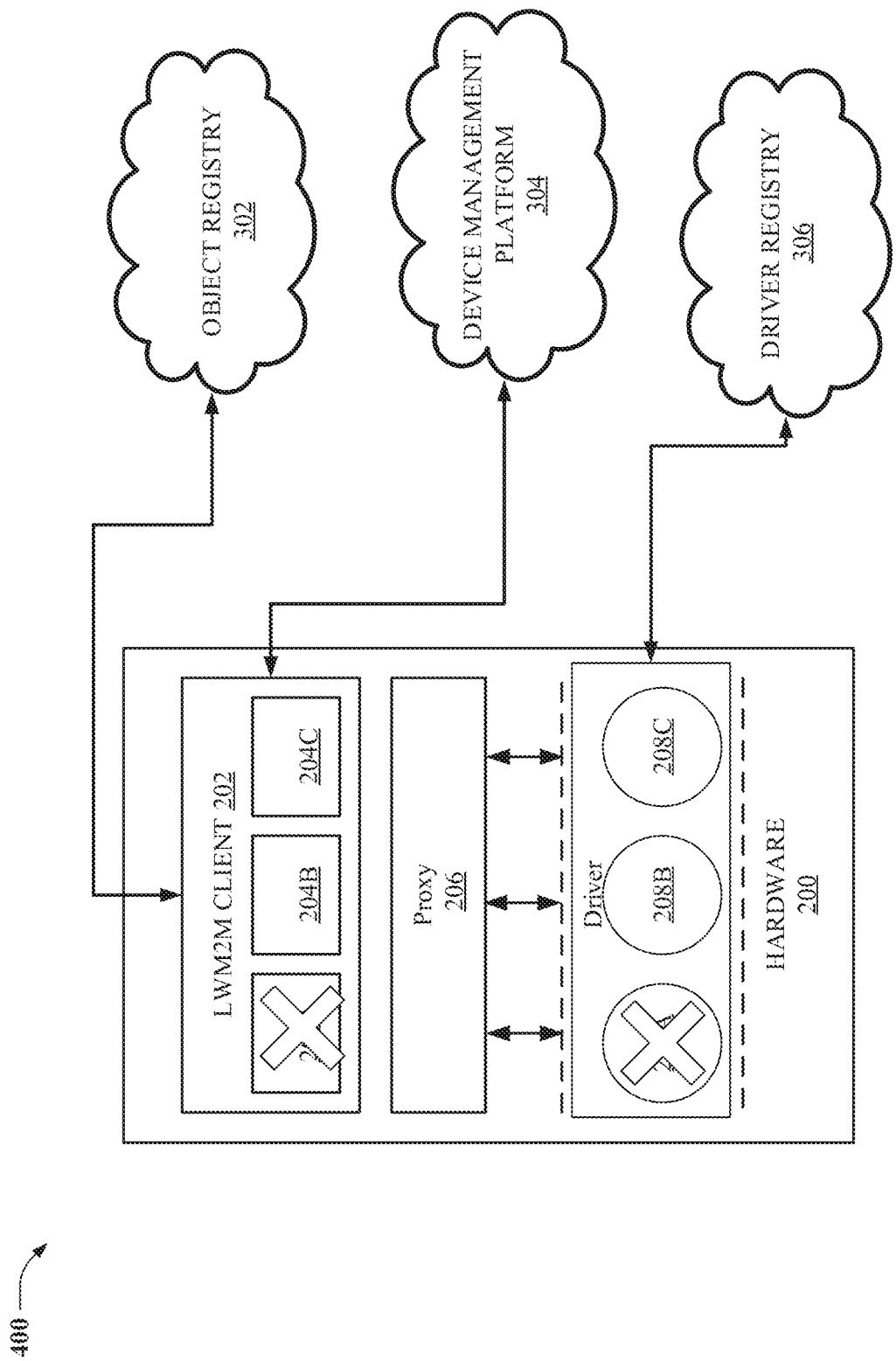
FIG. 4 illustrates an example schematic system block diagram of an IoT device updating system according to one or more embodiments.
Figure 5:
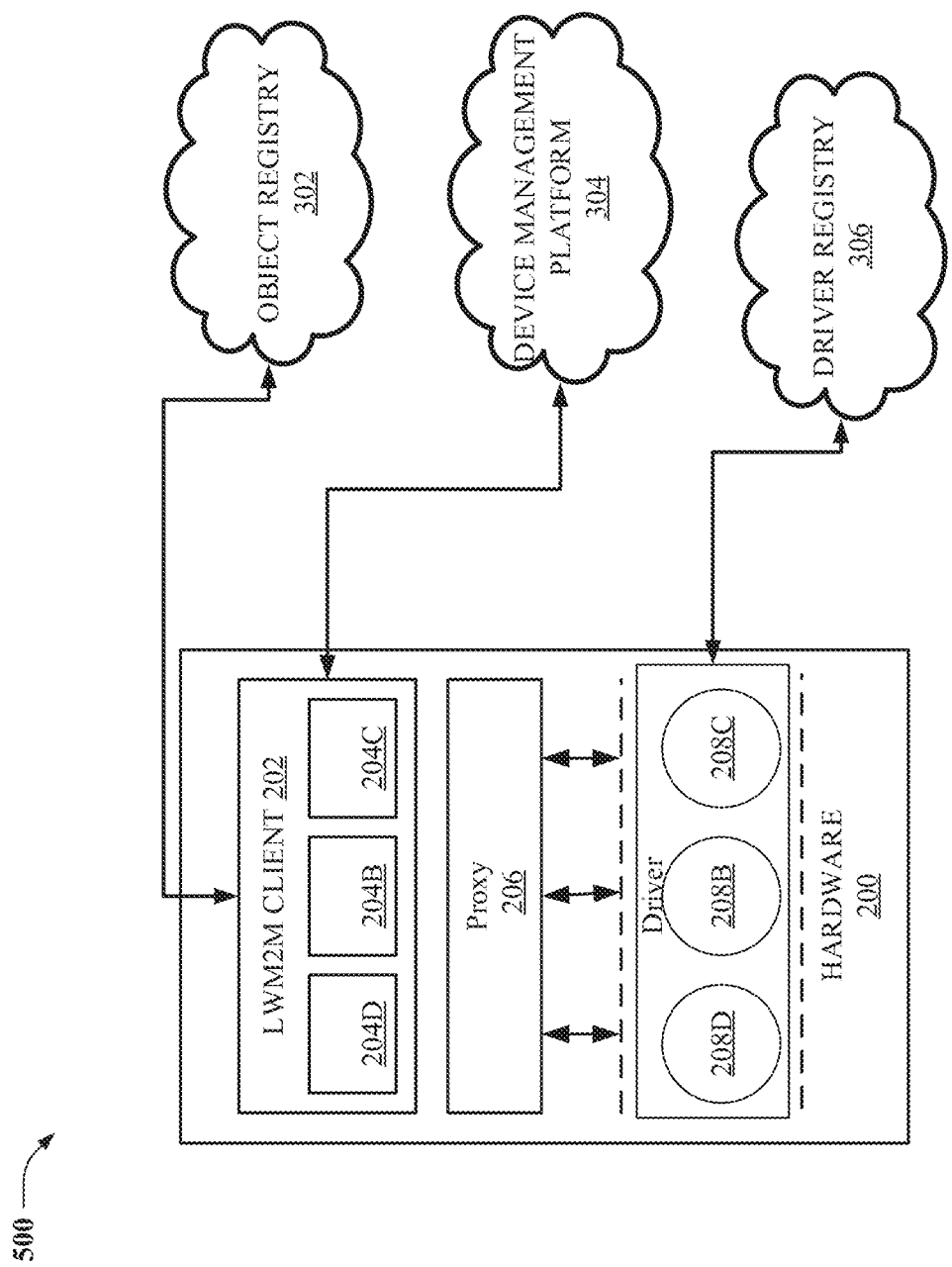
FIG. 5 illustrates an example schematic system block diagram of an IoT device updating system according to one or more embodiments.

Referring now to FIG. 4 and FIG. 5, illustrated is an example schematic system block diagram of an internet of things device updating system according to one or more embodiments. Within this platform, sensors can be repurposed. For example, hardware devices that were used to procure temperature data can be repurposed and no longer need to use general purpose input/output sensors (GPIO) anymore. Thus, as depicted in FIG. 4, a delete operation can be performed on the temperature object 204A at the object registry 302, which can then be sent to the LWM2M client 202 to delete the temperature object 204A on the LWM2M client 202 accordingly. Once the delete operation is communicated to the LWM2M client 202, the LWM2M client can remove the temperature driver 208A and/or prevent the temperature driver 208A from operating. Thus, the object registry 302 can take back over control of the pins from the temperature driver 208A that the developer has developed and instantiated on the hardware device 200 via the sensor driver registry 306. As depicted in FIG. 5, these pins can then be repurposed for a different driver 208D (e.g., a Wi-Fi driver) associated with a different object 204D (e.g., Wi-Fi object). It should be understood that various objects and drivers (e.g., Bluetooth, global positioning system, accelerometer, etc.) can be utilized for purposes of the disclosure and that the objects and drivers should not be limited to temperature and Wi-Fi objects and drivers.

Figure 6:
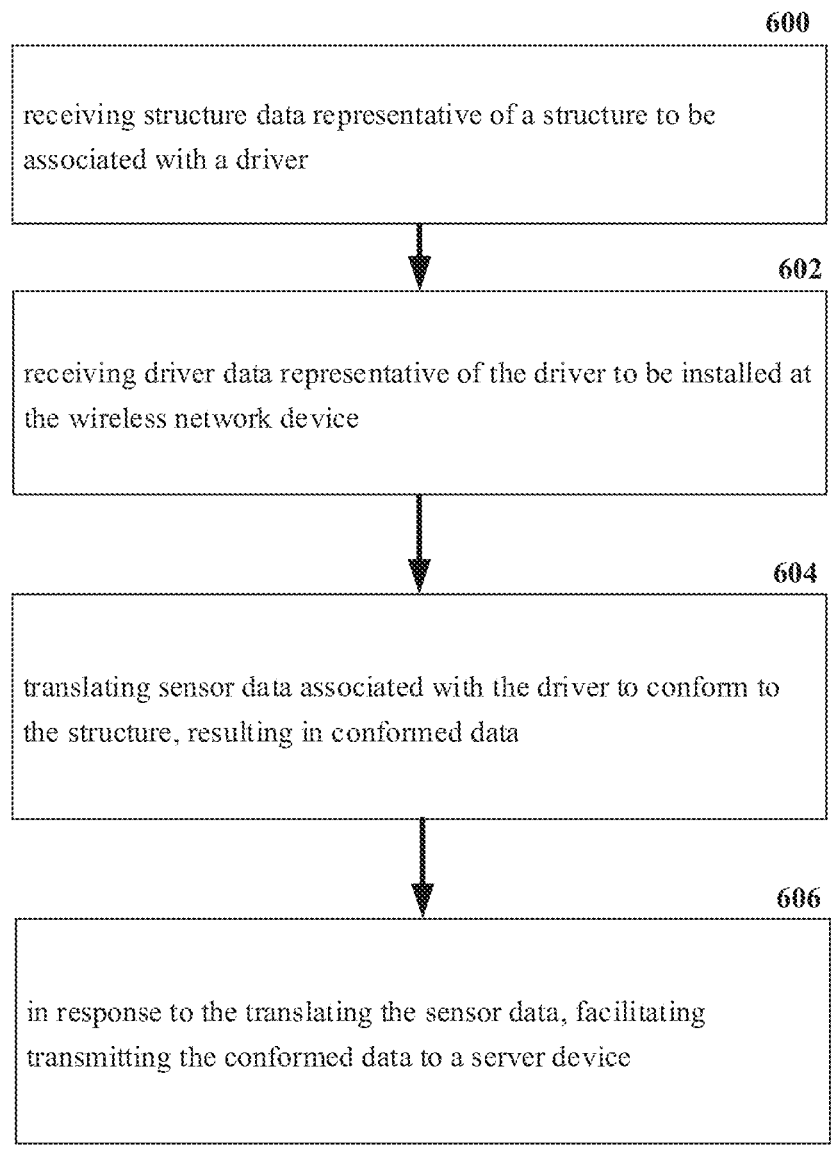
FIG. 6 illustrates an example flow diagram of a method for facilitating container management for IoT devices for a 5G network according to one or more embodiments.

Referring now to FIG. 6, illustrated is an example flow diagram of a method for facilitating container management for IoT devices for a 5G network according to one or more embodiments. At element 600, the method comprising receiving structure data representative of a structure to be associated with a driver. At element 602, the method can comprise receiving driver data representative of the driver to be installed at the wireless network device. Additionally, at element 604, the method can comprise translating sensor data associated with the driver to conform to the structure, resulting in conformed data. Furthermore, in response to the translating the sensor data, the method can comprise facilitating transmitting the conformed data to a server device at element 606.

Figure 7:
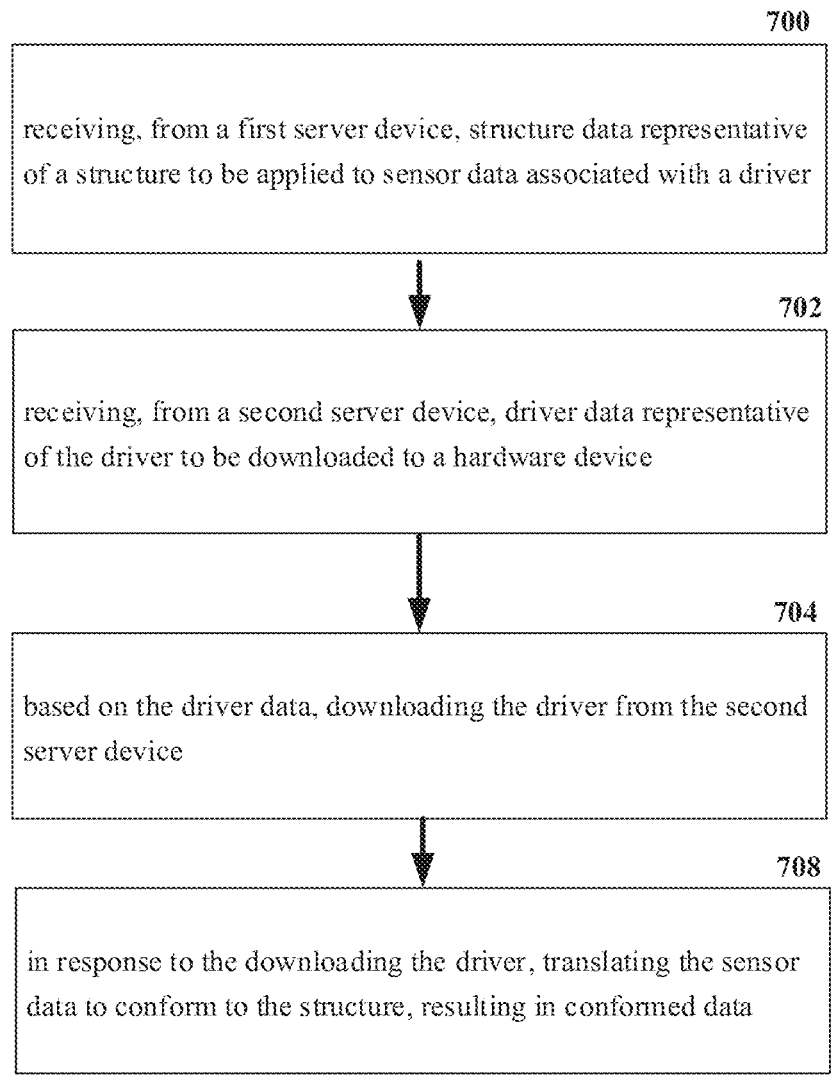
FIG. 7 illustrates an example flow diagram of a system for facilitating container management for IoT devices for a 5G network according to one or more embodiments.

Referring now to FIG. 7, illustrated is an example flow diagram of a system for facilitating container management for IoT devices for a 5G network according to one or more embodiments. At element 700, the system can facilitate, receiving, from a first server device, structure data representative of a structure to be applied to sensor data associated with a driver. At element 702, the system can comprise receiving, from a second server device, driver data representative of the driver to be downloaded to a hardware device. Based on the driver data, at element 704, the system can comprise downloading the driver from the second server device. In response to the downloading the driver, at element 706, the system can comprise translating the sensor data to conform to the structure, resulting in conformed data.

Figure 8:
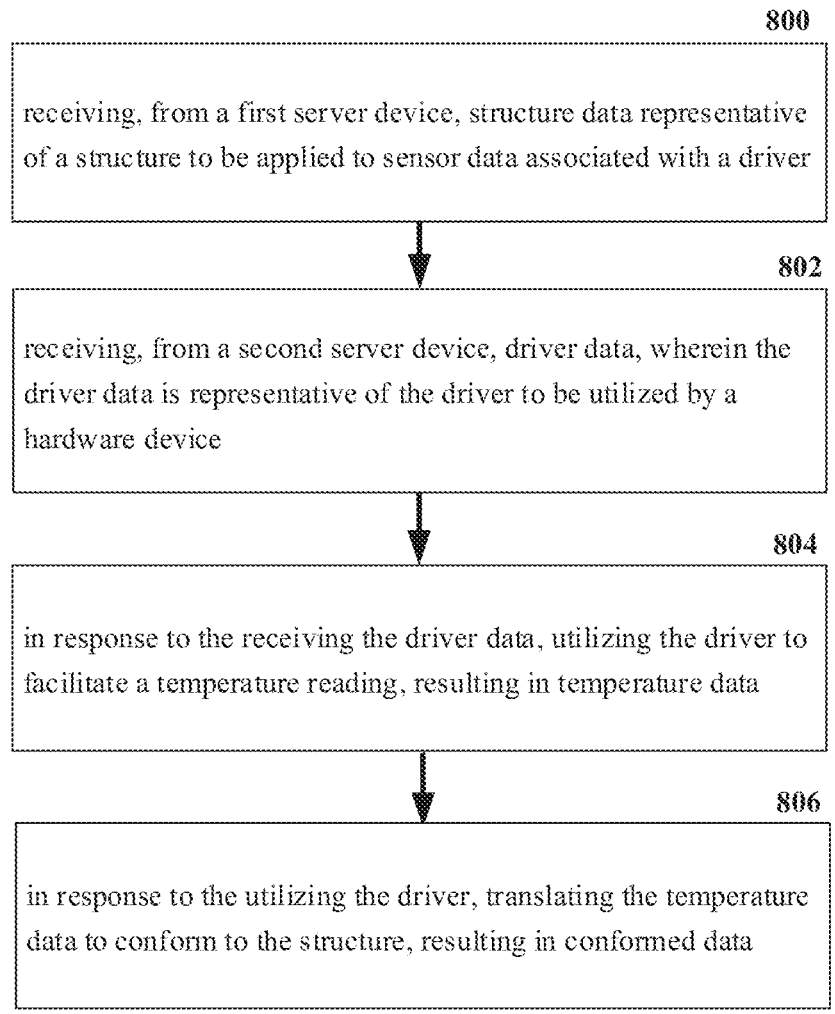
FIG. 8 illustrates an example flow diagram of a machine-readable medium for facilitating container management for IoT devices for a 5G network according to one or more embodiments.

Referring now to FIG. 8, illustrated is an example flow diagram of a machine-readable medium for facilitating container management for IoT devices for a 5G network according to one or more embodiments. At element 800, the machine-readable storage medium that can perform the operations comprising receiving, from a first server device, structure data representative of a structure to be applied to sensor data associated with a driver. At element 802, the machine-readable storage medium can perform the operations comprising receiving, from a second server device, driver data, wherein the driver data is representative of the driver to be utilized by a hardware device. Additionally, at element 804, in response to the receiving the driver data, the machine-readable storage medium can perform the operations comprising utilizing the driver to facilitate a temperature reading, resulting in temperature data. Furthermore, in response to the utilizing the driver, at element 806, the machine-readable storage medium can perform the operations comprising translating the temperature data to conform to the structure, resulting in conformed data.

Figure 9:
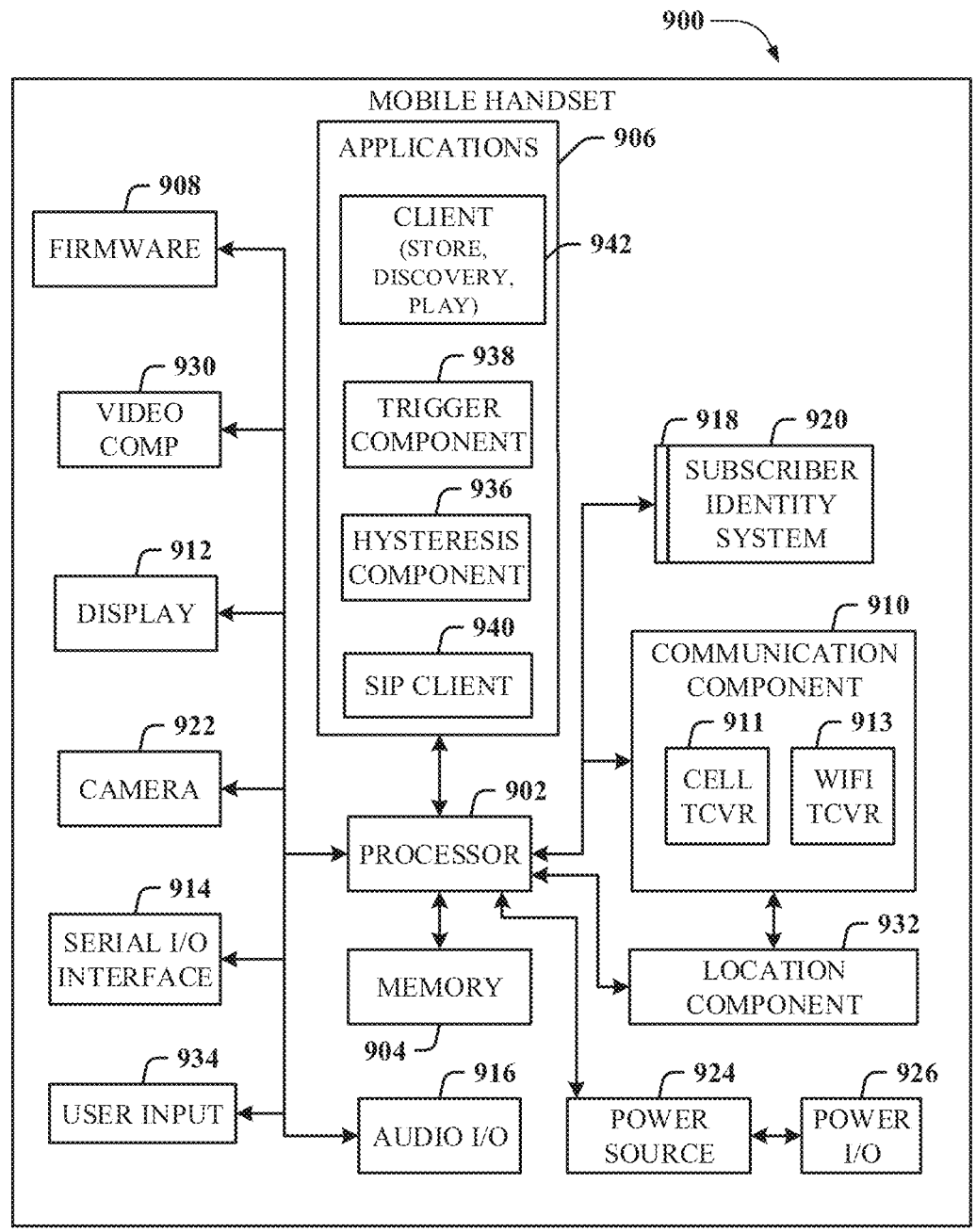
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
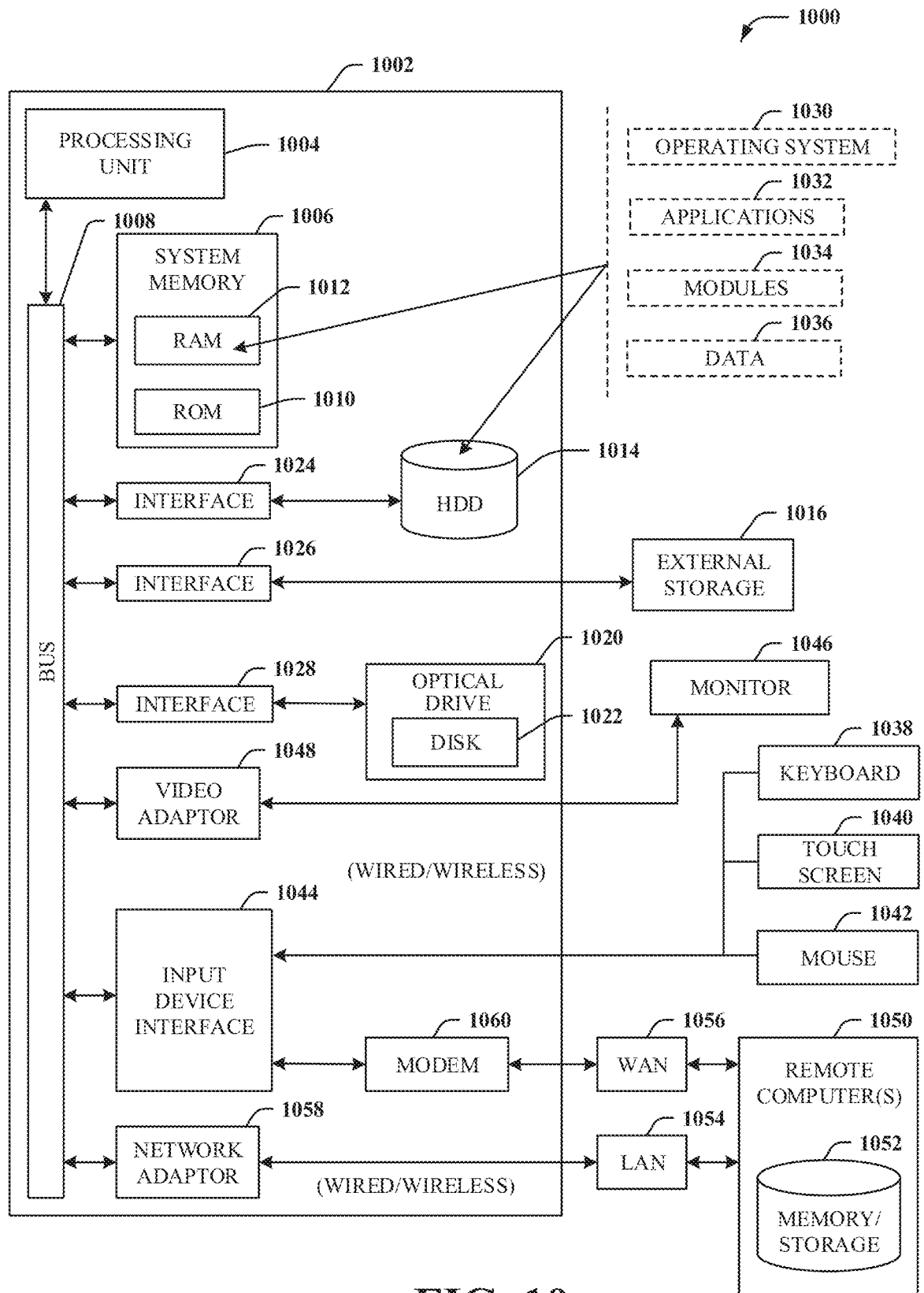
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a network device comprising a processor, object data representative of an object associated with a driver to be installed at an Internet-of-things device;
sending, by the network device, to the Internet-of-things device, driver data representative of the driver for installation at the Internet-of-things device;

translating, by the network device, via a proxy function of the network device, sensor data received from the driver installed at the Internet-of-things device to conform to the object, resulting in conformed data;

in response to the translating the sensor data, facilitating, by the network device, transmitting the conformed data to a server device; and in response to determining that the object has been deleted from the network device, preventing, by the network device, the driver installed at the Internet-of-things device from controlling a hardware pin of the Internet-of-things device.

2. The method of claim 1, wherein the object data is received from the server device.

3. The method of claim 1, wherein transmitting the conformed data is facilitated via a lightweight machine-to-machine device of the network device.

4. The method of claim 1, wherein the sensor data comprises temperature data representative of a temperature.

5. The method of claim 1, wherein the driver is a first driver, wherein the driver data is first driver data, and further comprising:

receiving, by the network device, second driver data representative of a second driver.

6. The method of claim 5, wherein the sensor data is first sensor data of a first type, and the second driver is configured to obtain second sensor data of a second type different from the first type.

7. The method of claim 1, further comprising, repurposing, by the network device, the hardware pin of the Internet-of-things device to be controlled by another driver installed at the Internet-of-things device.

8. Network equipment, comprising:

a processor; and a memory that stores executable instructions that, when executed by the processor, facilitate performance of operations, comprising:

in response to determining that an object has been installed at the network equipment, wherein the object is associated with a driver to be installed at an Internet-of-things device, transmitting, to the Internet-of-things device, driver data representative of the driver for installation at the Internet-of-things device;

translating sensor data, via a proxy function of the network equipment, received from the driver installed at the Internet-of-things device to a format of the object, resulting in conformed data;

transmitting the conformed data to a server device; and in response to determining that the object has been deleted from the network equipment, preventing the driver installed at the Internet-of-things device from controlling a group of pins of input and output hardware of the Internet-of-things device.

9. The network equipment of claim 8, wherein the object is received from the server device.

10. The network equipment of claim 8, wherein the transmitting the conformed data is facilitated via a lightweight machine-to-machine device of the network equipment.

11. The network equipment of claim 8, wherein the sensor data comprises temperature data representative of a temperature.

12. The network equipment of claim 8, wherein the driver is a first driver, the driver data is first driver data, and the object is a first object, and wherein the operations further comprise:

in response to determining that a second object has been installed at the network equipment, wherein the second object is associated with a second driver to be installed at the Internet-of-things device, transmitting, to the Internet-of-things device, second driver data representative of the second driver for installation at the Internet-of-things device.

13. The network equipment of claim 12, wherein the sensor data is first sensor data of a first type, and the second driver is configured to obtain second sensor data of a second type different from the first type.

14. The network equipment of claim 8, wherein the operations further comprise, repurposing the group of pins of input and output hardware of the Internet-of-things device to be controlled by another driver installed at the Internet-of-things device.

15. A non-transitory machine-readable medium, comprising executable instructions that, when executed by a processor of network equipment, facilitate performance of operations, comprising:

in response to determining that an object has been installed at the network equipment, wherein the object is associated with a driver to be installed at an Internet-of-things device, transmitting, to the Internet-of-things device, driver data representative of the driver for installation at the Internet-of-things device;

translating sensor data, via a proxy function of the network equipment, received from the driver installed at the Internet-of-things device to a format of the object, resulting in normalized data;

transmitting the normalized data to a server device; and in response to determining that the object has been deleted from the network equipment, preventing the driver installed at the Internet-of-things device from controlling a group of hardware pins of the Internet-of-things device.

16. The non-transitory machine-readable medium of claim 15, wherein the object is received from the server device.

17. The non-transitory machine-readable medium of claim 15, wherein the transmitting the normalized data is facilitated via a lightweight machine-to-machine device of the network equipment.

18. The non-transitory machine-readable medium of claim 15, wherein the sensor data comprises a first type of sensor data.

19. The non-transitory machine-readable medium of claim 18, wherein the driver is a first driver, the driver data is first driver data, and the object is a first object, and wherein the operations further comprise:

in response to determining that a second object has been installed at the network equipment, wherein the second object is associated with a second driver to be installed at the Internet-of-things device, transmitting, to the Internet-of-things device, second driver data representative of the second driver for installation at the Internet-of-things device, wherein the second driver is configured to obtain a second type of sensor data different from the first type.

20. The non-transitory machine-readable medium of claim 15, wherein the operations further comprise, repurposing the group of hardware pins of the Internet-of-things device to be controlled by another driver installed at the Internet-of-things device.

* * * * *